United States Patent [19]
Campau
[11] Patent Number: 4,527,593
[45] Date of Patent: Jul. 9, 1985

[54] APPARATUS AND SYSTEM FOR FILLING ONE OR MORE CONTAINERS WITH A LIQUID TO A PREDETERMINED LEVEL

[76] Inventor: Daniel N. Campau, 656 Duxbury Ct., SE., Grand Rapids, Mich. 49506

[21] Appl. No.: 491,521

[22] Filed: May 4, 1983

[51] Int. Cl.³ .......................... F15K 3/04; F16K 21/18

[52] U.S. Cl. .................................... 137/805; 137/393; 137/386; 137/260; 251/28; 141/198

[58] Field of Search ............... 137/393, 198, 494, 386, 137/804, 805, 260, 261; 127/810, 811, 812, 803; 251/28; 141/198

[56] References Cited

U.S. PATENT DOCUMENTS

| | | | |
|---|---|---|---|
| Re. 29,715 | 8/1978 | Richards et al. | 141/226 |
| 3,561,465 | 2/1971 | de Graaf | 137/386 X |
| 3,654,957 | 4/1972 | Fichter | 137/596.14 |
| 3,703,907 | 11/1972 | Richards | 137/386 |
| 3,828,833 | 8/1974 | Smith et al. | 141/198 |
| 4,148,334 | 4/1979 | Richards | 137/393 X |
| 4,211,241 | 7/1980 | Richards | 137/393 |
| 4,292,997 | 10/1981 | Pataki et al. | 137/393 |
| 4,484,601 | 11/1984 | Campau | 137/805 |

*Primary Examiner*—Martin P. Schwadron
*Assistant Examiner*—John S. Starsiak, Jr.
*Attorney, Agent, or Firm*—Niro, Scavone, Haller & Niro

[57] ABSTRACT

An apparatus and system for filling containers with a required liquid to a predetermined level are disclosed. The apparatus includes a main valve means for controlling the flow of liquid through the apparatus and into the container; a fluid amplifier means for receiving at least a portion of the liquid from the main valve means and for generating a pressure signal until such time as the liquid within the container reaches the predetermined level; and pilot valve means for maintaining the main valve means open in the presence of the pressure signal from the fluid amplifier and for closing the main valve means in the absence of the pressure signal. The system includes the aforesaid apparatus together with liquid supply conduit and valve means.

15 Claims, 11 Drawing Figures

FIG. 1
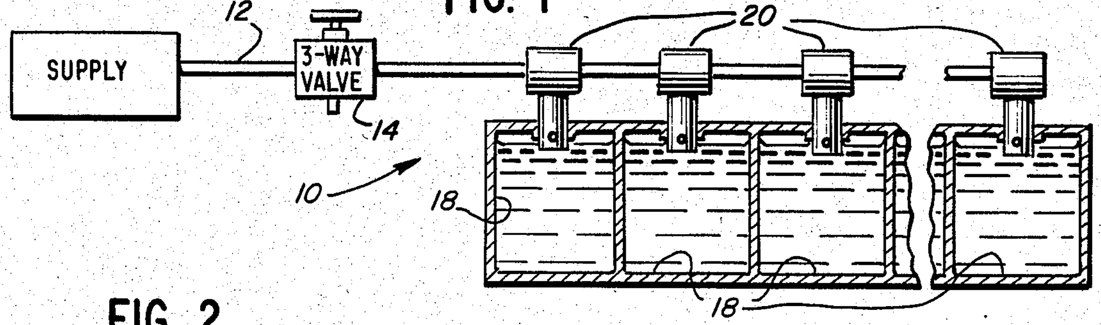
FIG. 2
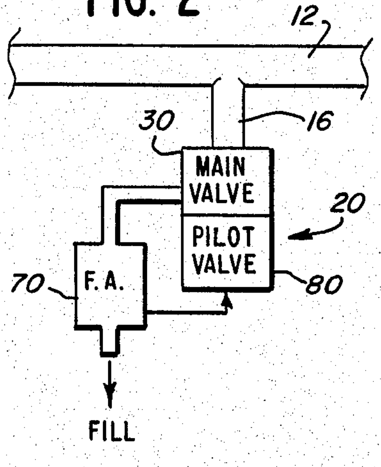
FIG. 4
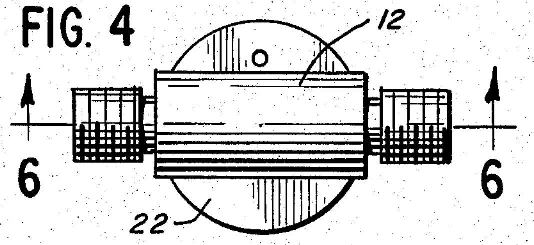
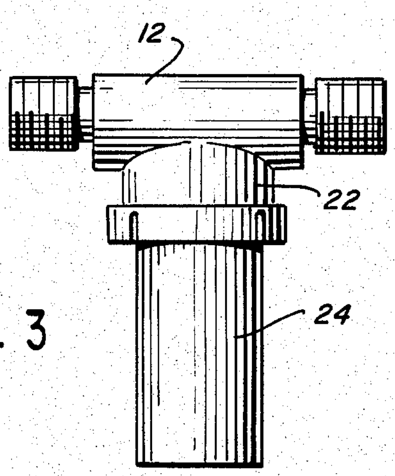
FIG. 3
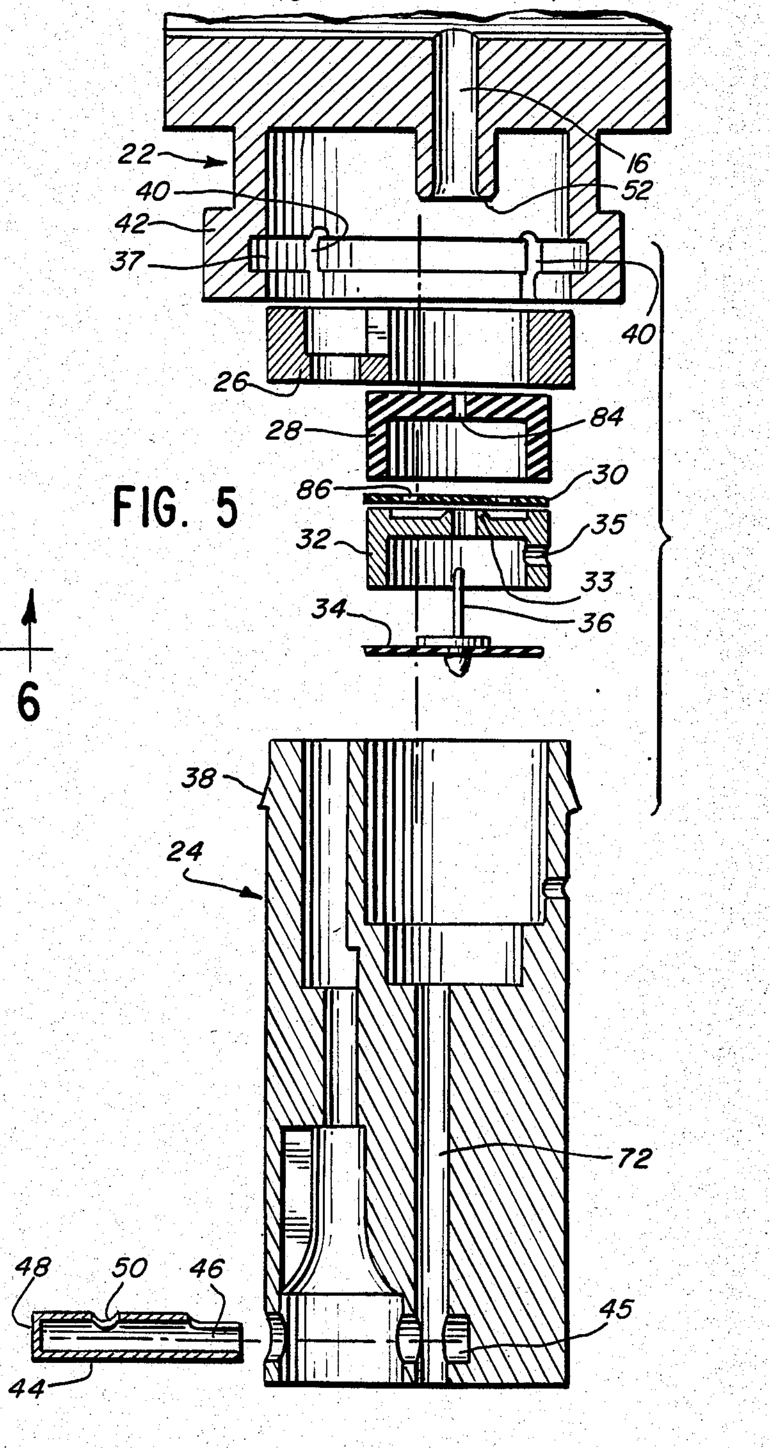
FIG. 5

APPARATUS AND SYSTEM FOR FILLING ONE OR MORE CONTAINERS WITH A LIQUID TO A PREDETERMINED LEVEL

BACKGROUND OF THE INVENTION

The present invention relates generally to fluid controls and, more particularly, to apparatus and a system for filling containers with a liquid. The invention utilizes fluidic controls, as opposed to electrical or mechanical controls, which require only the static and dynamic energy of the liquid medium as a power source. The invention finds advantageous application in automated systems for simultaneously filling a number of separate containers from a single supply.

SUMMARY OF THE INVENTION

The apparatus of the present invention is extremely simple in design and construction and can be effectively used to fill a container with a liquid to a predetermined level. In its simplest form, the apparatus of the present invention comprises three elements: a main valve means, a fluid amplifier means and a pilot valve means. The main valve means controls the flow of liquid through the apparatus and into the container; the fluid amplifier means receives at least a portion of the liquid from the main value means and generates a pressure signal from the liquid flowing through it, but only until the liquid within the container reaches the predetermined level; and the pilot valve means acts to hold the main valve means open in the presence of the pressure signal received from the fluid amplifier means and to close the main valve means in the absence of the pressure signal.

The present invention also contemplates a system wherein a plurality of containers can be filled simultaneously. The system comprises a liquid supply conduit, a valve in the conduit on the supply side of the containers and a plurality of container filling means, the apparatus previously described. Each of the containers is serviced by one of the container filling means which tap into the common liquid supply conduit and which independently fill their respective containers to the predetermined liquid level. Each container filling means closes independently of the others, and the predetermined liquid level can be set independently for each container. Preferably, the liquid supply valve is controlled automatically, and it may be located remote from the containers if desired.

In accordance with a preferred embodiment of the invention, a new and unique fluid amplifier is employed which simplifies the design and construction of the amplifier and provides operational advantages as well. The new fluid amplifier is of the laminar to turbulent diverting flow type and includes inlet means for developing a substantially laminar fluid power stream, an outlet means including first and second outlets, a guidewall positioned adjacent the power stream and including an outwardly diverging portion, and an access slot in the guidewall. The power stream generated by the inlet means, or a portion of it, impinges upon the first outlet and thereby creates a pressure signal useful in operating fluid controls. However, when the liquid in the container serviced by the amplifier reaches the desired or predetermined level, the second outlet is covered, preventing aspiration of air into the amplifier. Because the laminar power stream aspirates fluid adjacent the inlet means and no air can reach this low pressure area due to the liquid level covering the amplifier, liquid from the power stream recirculates to the base of the power stream via the access slot. This recirculating liquid acts as a perturbant signal which changes the power stream from laminar to turbulent flow and causes the power stream to divert along the diverging guidewall and away from the first outlet. Accordingly, the static presence of the liquid level at the lowermost terminus of the amplifier results in an immediate disruption and termination of the pressure signal.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

FIG. 1 is a schematic view illustrating the general arrangement of the system of the present invention as used to service a plurality of containers;

FIG. 2 is also a schematic view serving to illustrate the general arrangement of the components which make up the container filling device of the present invention;

FIG. 3 is a side elevation of one preferred embodiment of the container filling device of the present invention;

FIG. 4 is a top view of the container filling device shown in FIG. 3;

FIG. 5 is an exploded view, in cross section, illustrating the individual elements which make up the container filling device of FIG. 3;

DETAILED DESCRIPTION OF THE PREFERRED EMBODIMENT

Figure 6:
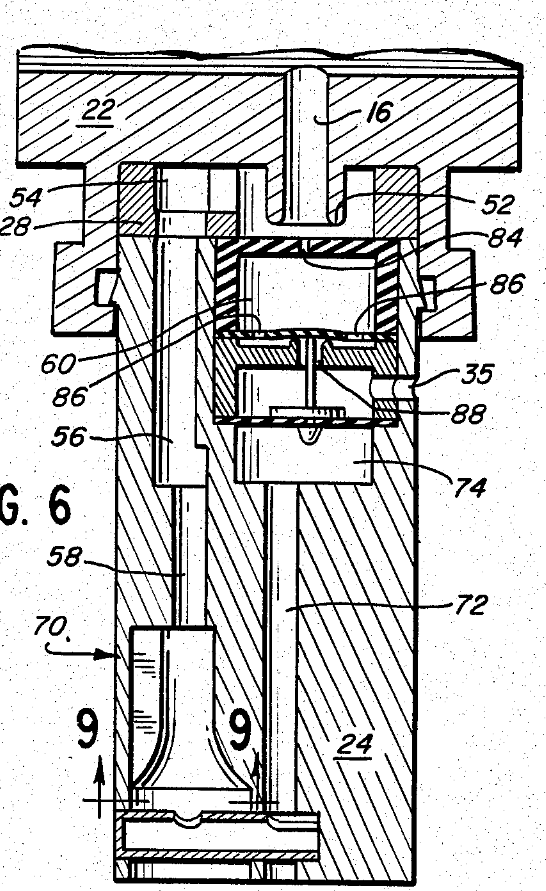
FIG. 6 is a cross-sectional view taken along lines 6—6 of FIG. 4 and showing the container filling device of FIG. 3 in the non-operating ready mode with no supply pressure applied.

Referring to the drawings, and particularly FIGS. 1 and 2, a container filling system and apparatus are illustrated. The system is designated generally as 10 and includes a liquid supply conduit 12 connected to a source of liquid under pressure, a liquid supply valve 14, and a plurality of container filling means 20, each servicing an individual container 18. Each filling means 20 is connected to conduit 12 via tap line 16 and includes a main valve means 30, a fluid amplifier means 70 and pilot valve means 80.

Conduit 12 provides an unobstructed flow passageway from valve 14 to each of the filling means 20 which operate to fill their respective containers independently of one another. Preferably, valve 14 is of a three-way design to permit opening or closing the system to the pressurized liquid supply or venting the system to atmosphere. The valve 14 may be manually or automatically operated and may be positioned, as shown in FIG. 1, at a remote location from the containers 18. Alternatively, separate valves may be employed in the tap lines 16 to actuate each filling means 20 separately.

With reference now to FIGS. 3–5, one preferred embodiment of filling means 20 is illustrated. This particular filling device is ideally suited for use in connection with maintaining proper levels of electrolyte in individual cells of industrial batteries. However, reference to this particular application is merely exemplary, and those skilled in the art will appreciate the wide variety of environments in which the present invention may be employed, i.e., virtually any liquid handling system in which a given level of liquid is to be provided or maintained in a container or reservoir.

Filling means 20 includes upper and lower housings, 22 and 24 respectively, which are assembled in snap-fit engagement to provide a single unit having no external moving parts. Assembled within the housings are spacer means 26, main valve 28, flapper valve 30, pilot spacer 32, diaphram 34 and actuator pin 36. Housing 22 includes an annular recess 37 having a configuration and location to coact with circumferential detent 38 on the lower housing 24 to hold the housings in snap-fit engagement when fully assembled. Slots 40 in the depending cylindrical wall 42 permit resilient expansion of wall 42 as the lower housing 24 is assembled within upper housing 22. A receiver tube 44 is also mounted in press fit engagement within bore 45 of housing 24, and includes an open end 46, a closed end 48 and a receiver port 50.

Figure 7:
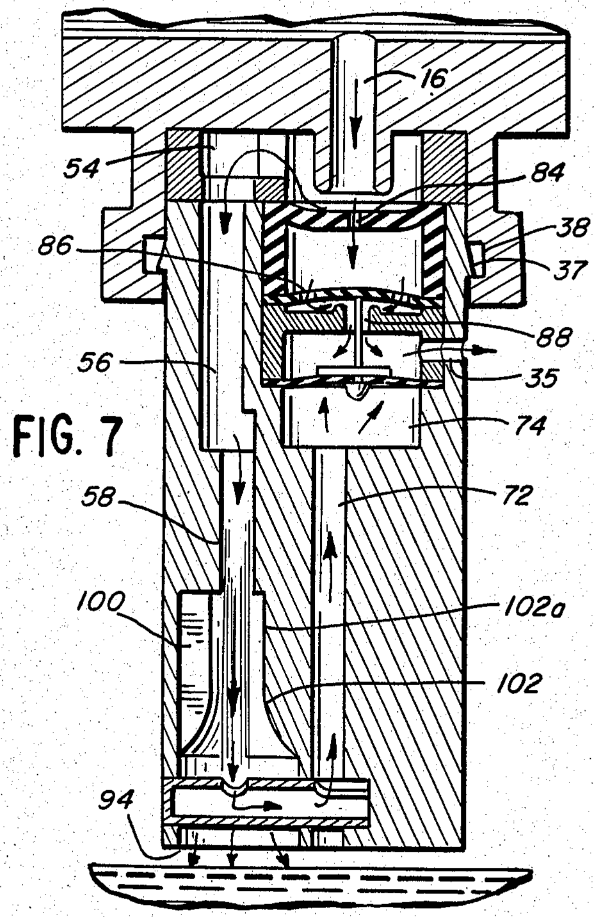
FIG. 7 is also a cross-sectional view similar to that of FIG. 6, but illustrating the container filling device in the filling mode with supply pressure applied and the liquid level in the container below the predetermined level.
Figure 9:
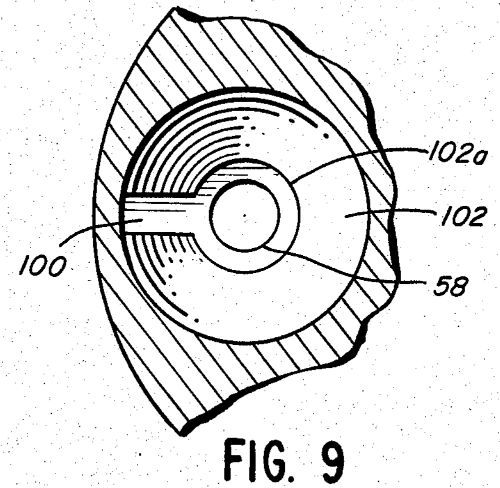
FIG. 9 is a cross-sectional view along line 9—9 of FIG. 6 showing details of the new fluid amplifier of the present invention.

When fully assembled, container filling means 20 is arranged as shown in FIG. 6, which illustrates the device in its non-operating but "ready" mode with no supply pressure applied. The main valve means communicates directly with tap line 16 and includes an annular main valve seat 52 and main valve 28. In this "ready" mode, main valve 28 is spaced slightly from valve seat 52 and flapper valve 30 is held slightly above pilot seat 33 by actuator pin 36. Therefore, when supply pressure is applied, the supplied liquid will flow through the valve and into passageways 54 and 56 as shown in FIG. 7, and liquid under pressure will also pass through central orifice 84 in main valve 28 into valve cavity 60 and through to discharge port 35.

Passageway 56 communicates directly with passageway 58 which forms the inlet means to fluid amplifier means 70. The liquid discharged from inlet means 58 is in the form of a laminar flow power stream which is received at least in part by a first outlet of the fluid amplifier, receiver port 50. As a result, a liquid pressure signal is generated for actuation of pilot valve means 80. The pressure signal is first developed in receiver tube 44 and is transmitted via passageway 72 and pressure cavity 74 to flexible diaphram 34 which is displaced upwardly under the force created by the fluid pressure. Likewise, actuator pin 36 is displaced upwardly and thereby holds flapper valve 30 in spaced relation to pilot valve seat 33. In this arrangement or "filling" mode, the high pressure supply liquid flows from conduit 12 and tap line 16 through the main valve and fluid amplifier 70 and, ultimately, into the container. In addition, a small portion of the supply liquid flows through central orifice 84 in main valve 28, through ports 86 in flapper valve 30, through passage 88 in the pilot spacer 32 and out through discharge port 35. As is understood by those skilled in the art, each of these passageways is provided, in sequence, with a slightly larger cross-sectional area in order to insure that no pressure developes in valve cavity 60.

The fluid amplifier 70 illustrated in FIGS. 6–9 is in many respects similar to the laminar to turbulent diverting flow type amplifiers disclosed in U.S. Pat. No. 3,703,907 the disclosure of which is incorporated herein by reference. Thus, the specific shape and dimensional parameters of such fluid amplifiers will be readily apparent to those skilled in the art from the disclosure of said patent, and, as such alone, form no part of this invention. There are, however, certain novel structural and functional features of fluid amplifier 70 which will be apparent in the following description which are a part of the present invention.

Figure 8:
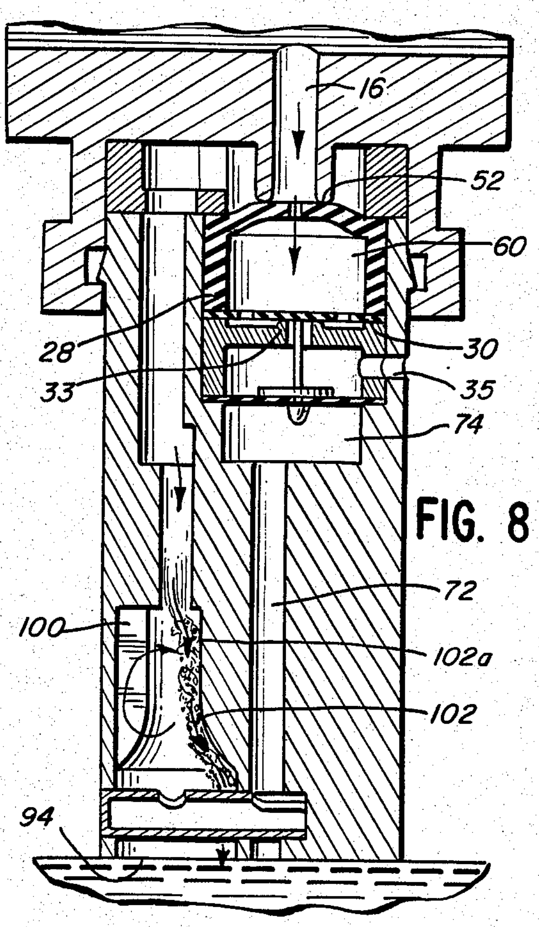
FIG. 8 is still another cross-sectional view similar to FIG. 6, but showing the container filling device in the closed mode with supply pressure applied and the liquid at the predetermined level.

The container filling means 20 will, in the "filling" mode, function as described above so long as the liquid within the container is below the predetermined level. Thus, the fluid amplifier 70 will develop a laminar flow power stream which impinges on receiver tube 44 and receiver port 50 thereby generating the requisite pressure signal. The laminar flow power stream aspirates air from the space defined by diverging guidewall 102 between inlet means 58 and receiver tube 44. Ambient air, in turn, is drawn into the amplifier through its second outlet 94 located at the lowermost terminus of the amplifier. However, when the liquid in the container reaches and covers outlet 94, air can no longer satisfy the low pressure created within the amplifier by virtue of the aspirating effect of the laminar power stream. As a result, a part of the spray emanating from the power stream as it impinges on receiver tube 44 recirculates to the base of the power stream via slot 100 which extends along the diverging guidewall 102 within the amplifier. This spray acts as a perturbant signal which interferes with the laminar flow of the power stream and instantly converts the power stream to turbulent flow. Because the turbulent power stream has a greater cross section than does the laminar power stream, and because of the proximity of portion 102*a* of guidewall 102, the turbulent power stream immediately attaches to the diverging guidewall in a fashion similar to the Coanda effect. Thus, as shown in FIG. 8, the turbulent power stream is immediately diverted along the guidewall 102 and away from the receiver port 50 thereby terminating the pressure signal. As a result, diaphram 34 and actuator pin 36 are no longer biased upwardly against flapper valve 30, and the pressure drop across the pilot valve together with the differential in area on the upstream and downstream sides of the pilot valve cause the flapper valve 30 to close against pilot valve seat 33. Once this occurs, liquid can no longer escape from valve cavity 60, and the pressure within cavity 60 quickly rises to the liquid supply pressure causing the main valve 28 to seal against seat 52 due to the greater valve area on the lower side of valve 28.

In summary, and as shown in FIG. 8, with the supply pressure applied to filling means 20 and the liquid in the container at the level of the amplifier outlet 94, the pressure signal is terminated, and, in turn, the pilot valve and main valve close. All of this occurs virtually instantaneously.

It should be noted that so long as the supply pressure is maintained after closure of the filling means 20, the main valve 30 will remain closed regardless of the liquid level. As a result, the container serviced by the filling means 20 can be replaced by another, such as occurs in automated container filling operations.

In order to open main valve 30 and thereby return the filling means to its "ready" mode, the pressure supply must be reduced to below a predetermined minimum. In most applications, it will be most convenient to vent the supply conduit 12 to reduce supply pressure to 0 p.s.i.g., and this is the reason valve 14 is preferably of a 3-way design. Typically, if supply pressure is permitted to drop below about 1 p.s.i.g. for about one second, the main valve 30 will reopen and the apparatus will resume its "ready" mode.

The fluid amplifier 70 disclosed above enjoys the decided advantage not previously found in laminar to turbulent flow diverting amplifiers in that it uses the supply liquid to create the perturbant signal rather than liquid in the container which may contain contaminants that can clog or otherwise adversely affect the operation of the amplifier. In addition, none of the components of the amplifier 70, nor of the container filling means 20, need be submerged. Instead, the apparatus is located relative to the container so that the lowermost terminus of the amplifier is at the predetermined level.

Figure 10:
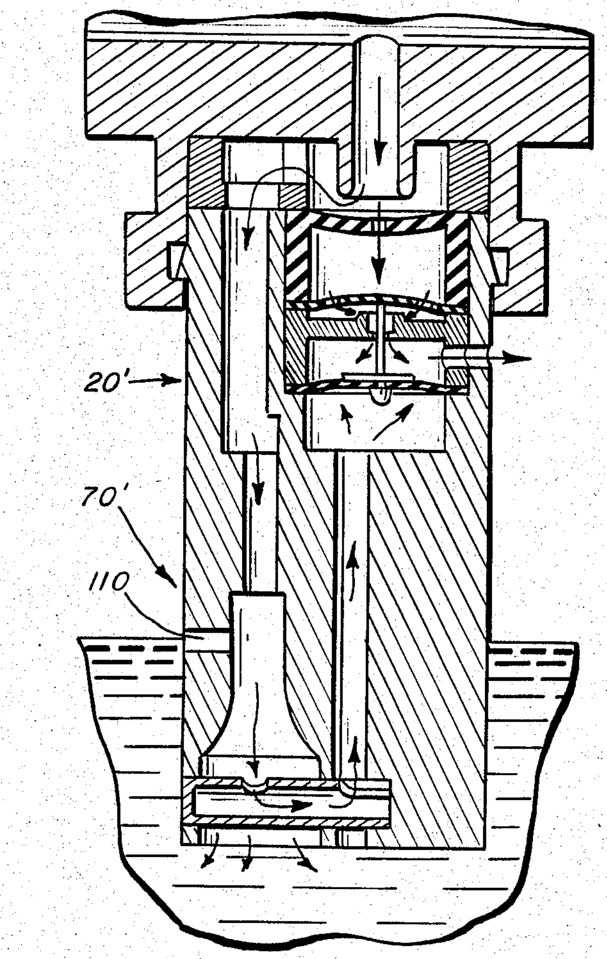
FIG. 10 is a cross-sectional view similar to that of FIG. 7 but illustrating another fluid amplifier construction which may be used with the container filling apparatus of the present invention.
Figure 11:
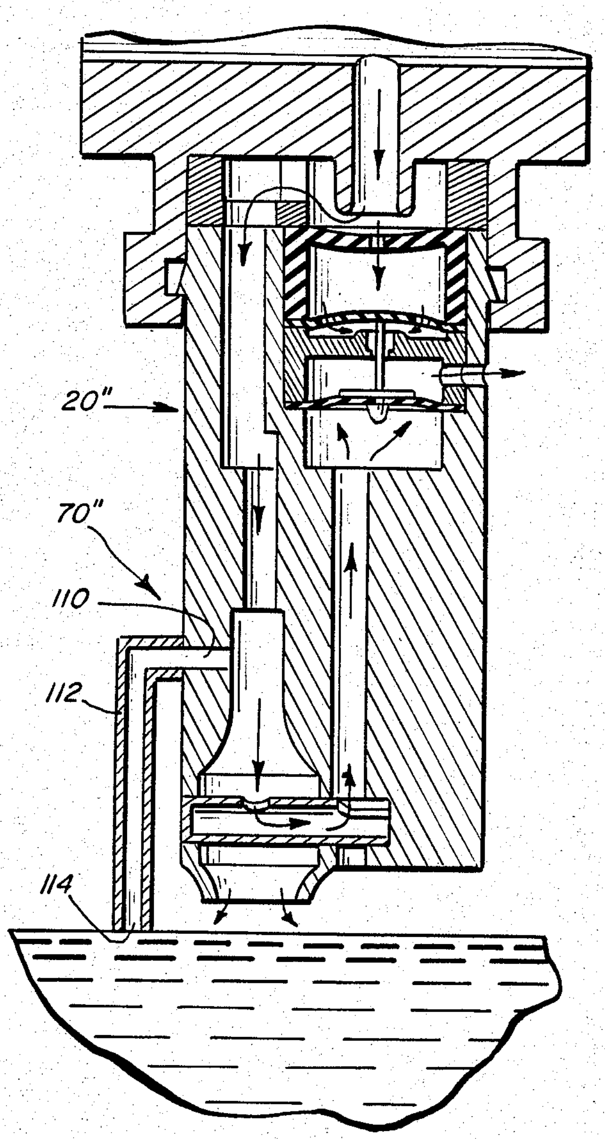
FIG. 11 is also a cross-sectional view similar to that of FIGS. 7 and 10, but showing still another fluid amplifier construction.

Despite its advantages, fluid amplifier 70 is not essential to the operation of container filling means 20, and similar filling means 20' and 20" are illustrated in FIGS. 10 and 11, respectively. Filling means 20' employes a liquid amplifier 70' of more conventional design including a perturbant signal access means in the form of a port 110 through diverging wall 102. In this embodiment, the filling means 20' is located relative to the container such that port 110 is positioned at the predetermined liquid level.

In FIG. 11, filling means 20" makes use of a fluid amplifier 70" having a perturbant signal access means in the form of a port 110 and a conduit 112 with a free end 114 positioned at the predetermined liquid level. Amplifier 20" also includes a restricted outlet means 118 which is necessary for aspiration of liquid up through conduit 112 and port 110. This "remote sensing" type laminar to turbulent diverting flow amplifier is more fully disclosed in commonly owned U.S. patent application Ser. No. 404,070, filed Aug. 2, 1982, the disclosure of which is incorporated herein by reference.

Those skilled in the art will recognize that the container filling means disclosed herein can be constructed from a wide range of well known materials, such as plastics, metals, ceramics and the like, depending upon the environment in which the apparatus is to be used. Likewise, the valves 28 and 30 and diaphram 34 can be made from molded elastomers, and preferably, valve 30 and diaphram 34 are constructed from a fiber reinforced elastomer such as that manufactured by the E. I. DuPont Company under the trademark FAIRPRENE.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An apparatus for filling a container with a liquid to a predetermined level comprising:

main valve means for controlling the supply of liquid to the container;

fluid amplifier means for receiving at least a portion of the liquid flowing through said main valve means and for generating a pressure signal in response to the flow of said liquid through the main valve means only until the liquid within said container reaches said predetermined level; and pilot valve means for maintaining the main valve means open in the presence of said pressure signal and for closing said main valve means in the absence of said pressure signal.

2. The apparatus of claim 1 wherein actuation of said main valve means, said fluid amplifier means and said pilot valve means to permit the flow of liquid into said container is effected by the increase of liquid supply pressure over a predetermined minimum; and wherein actuation of said main valve means, said fluid amplifier means and said pilot valve means to stop the flow of liquid into said container is effected by the liquid level within said container reaching said predetermined level.

3. The apparatus of claim 2 wherein said main valve remains closed after the liquid level reaches said predetermined level until the liquid supply pressure drops below said predetermined minimum.

4. The apparatus of claim 1 wherein said fluid amplifier means is a laminar to turbulent diverting flow type, fluid amplifier having an inlet means, a diverging guidewall, a perturbant signal access means and an outlet means including a pressure signal generating means.

5. The apparatus of claim 4 wherein said outlet means has a discharge terminus positioned at said predetermined level and said perturbant signal access means comprises a generally longitudinal slot in said diverging guidewall.

6. The apparatus of claim 4 wherein said perturbant signal access means comprises a port through said diverging guidewall, said port being positioned at said predetermined level.

7. The apparatus of claim 4 wherein said perturbant signal access means comprises a port through said diverging guidewall and a conduit extending from said port to a free end positioned at said predetermined level.

8. The apparatus of claim 1 wherein said main valve means includes a main valve seat and resilient main valve having a central orifice, said orifice providing a liquid passageway between the supply side of the main valve seat and a valve cavity behind said main valve; and wherein said pilot valve means includes a pilot valve seat, a resilient flapper valve, and an actuator pin carried by a resilient diaphram, said pilot valve seat providing a liquid passageway between said valve cavity and a discharge port; said diaphram and said pin acting in the presence of said pressure signal to hold open said pilot valve which in turn maintains the main valve open under the influence of a liquid supply pressure.

9. The apparatus of claim 1 wherein the main valve means, the fluid amplifier and the pilot valve means are positioned no lower than said predetermined liquid level.

10. The apparatus of claim 1 wherein the pressure within said container is above atmospheric pressure.

11. The apparatus of claim 1 wherein said main valve means, said fluid amplifier means and said pilot valve means are assembled into a single unit having no external moving components.

12. The apparatus of claim 1 further including first and second housings which assemble in snap-fit engagement to maintain said main valve means, said fluid amplifier means and said pilot valve means in operative relationship.

13. The apparatus of claim 1 further including a liquid supply conduit communicating with said main valve means, and a three-way liquid supply valve having an open position, a closed position and a vent position.

14. An apparatus for simultaneously filling a plurality of containers with a liquid to a predetermined level for each container, said apparatus comprising:

a liquid supply conduit;

a liquid supply valve in said conduit;

and a plurality of automatically closing container filling means, each such container filling means being associated with one of said containers and including main valve means for controlling the supply of liquid to the container; fluid amplifier means for receiving at least a portion of the liquid flowing through said main valve means and for generating a pressure signal in response to the flow of said liquid through the valve means only until the liquid within said container reaches said predetermined level; and pilot valve means for maintaining the main valve means open in the presence of said pressure signal and for closing said main valve means in the absence of said pressure signal.

15. A fluid amplifier adapted for sensing the level of a liquid in a container and for generating a differential in pressure signal in response to the static presence of the liquid level at a predetermined level, comprising:

inlet means for developing a fluid power stream;

outlet means spaced from said inlet means and including a first outlet for receiving at least a portion of said fluid power stream and a second outlet having its lowermost terminus positioned at said predetermined level, said first outlet generating a pressure signal in response to receipt of said portion of said power stream;

a guidewall extending adjacent the longitudinal axis of said fluid power stream from said inlet means toward said outlet means and including an outwardly diverging portion adjacent said outlet means; and an interior slot in said guidewall adjacent said inlet means and remote from said outlet means, whereby when the liquid level within said container reaches and covers the lowermost terminus of said outlet means second outlet, said fluid power stream is diverted along said diverging guidewall and away from said outlet means first outlet thereby terminating said pressure signal.

* * * * *